J. Wing,
Circular Sawing Machine,
Nº 635.
Patented Mar. 17, 1838.
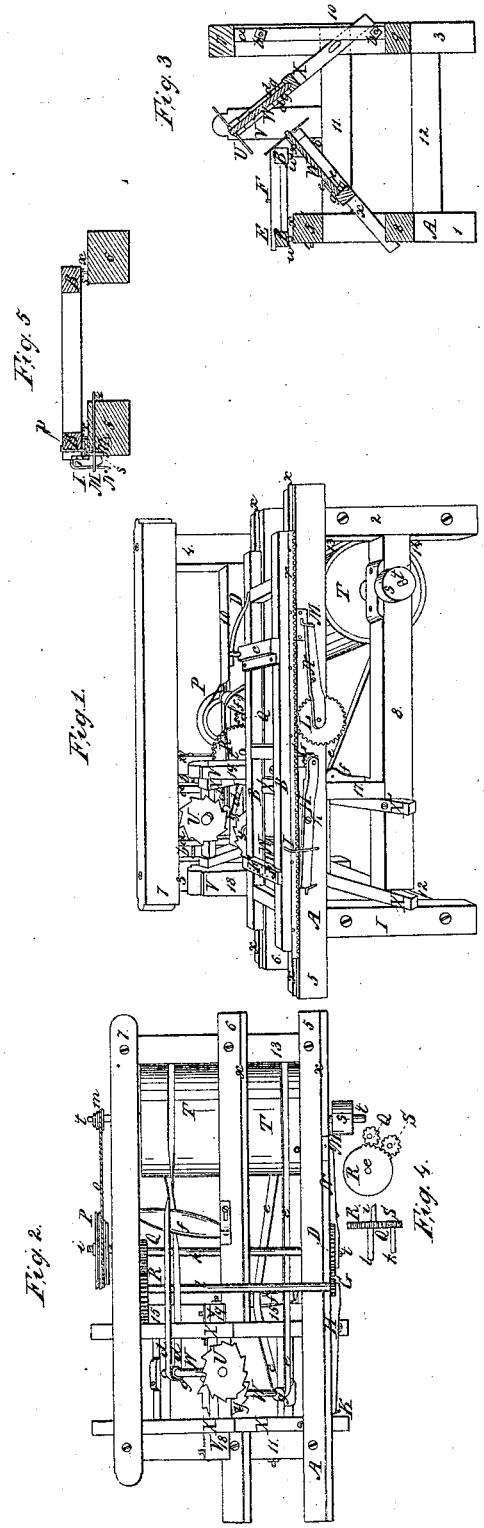

UNITED STATES PATENT OFFICE.

JIRA WING, OF HANCOCK, VERMONT.

MACHINE FOR SAWING EAVES-TROUGHS FOR CONDUCTING WATER FROM BUILDINGS, &c., APPLICABLE TO OTHER PURPOSES.

Specification of Letters Patent No. 635, dated March 17, 1838.

*To all whom it may concern:*

Be it known that I, JIRA WING, of Hancock, Addison county, State of Vermont, have invented a new and useful Machine for Sawing Eaves-Troughs and for other Purposes, which is described as follows, reference being had to the annexed drawings of the same, making part of this specification.

Figure 1, represents a perspective view of the machine. Fig. 2, represents a top view; Fig. 3, a cross section through the saw frame; Fig. 4, part of the gearing; Fig. 5, section of the carriage and ways.

The frame of this machine, marked A, is made rectangular, of a suitable size and strength to contain and support the several parts of the machine, hereafter described. One that I have used, represented in the annexed drawings, is composed of four posts 1, 2, 3, 4, three top pieces 5, 6, 7, three longitudinal side pieces 8, 9, 10, four end cross pieces 11, 12, 13, 14, one intermediate cross piece 15, Fig. 2, four perpendicular pieces 17, 18, 19, 20, all mortised and tenoned together in a suitable manner. The two rear posts 3, 4, are made higher than the two front posts 1, 2, upon which is placed the top piece 7. The two parallel top pieces 5, 6, serve as ways for the carriage to move over. One of them 6 has a piece cut out of it to admit the under saw frame X'. Two of the perpendicular pieces 18, 19, receive the bolts on which the saw frames move when it is required to change their angle of inclination. The perpendicular piece 20, receives the end of one of the longitudinal side pieces, which is made shorter than the others in order to form a space to admit the upper saw frame X to move in. This frame A may be varied in size, shape, and materials to suit circumstances.

U, and Y, represent the saws for sawing the eaves troughs. These saws are made circular and stand in relation to each other according to the angle of the required trough. The annexed drawing, Fig. 3, represents them standing at right angles with each other; of course the eaves troughs cut by them will be at right angles. They are placed over the rear side of the carriage and nearly over the center of the main frame and are fixed on the ends of spindles W, W, inclined at an angle of about 45 degrees with the horizon, turning in boxes supported on inclined frames X', X standing at the same angle. The lower saw frame X' is made stationary by screw bolts inserted into the main frame. It may however be made movable if required. The frame X, of the upper saw vibrates on bolts inserted into the perpendicular pieces 18, 19, and passing through the side pieces of the vibrating inclined saw frame having nuts on their inner ends. The lower ends of said saw frame when it is required to change the angle of the frame move loosely between clamp bars in the segment of a circle—the upper ends turning on the bolts before mentioned for changing the position of the upper saw in relation to the lower saw so as to cut the trough at any angle that may be required—the position of the lower saw remaining unchanged.

The clamps consist of two vertical bars *a a* put on four horizontal screw rods *b*, passing through one of the posts 3, and one of the perpendicular pieces 20 of the frame having a space between them and the bars to admit the side pieces of the frame—having nuts on the ends of the rods to clamp the saw frame at any angle required.

The carriage, B, consists of two parallel side pieces, connected together by three cross pieces, furnished with the usual head and tail block and dogs for securing the piece of timber from which the eaves trough is to be formed—also with four truck wheels *w* turning over the ways *x* fastened on the top pieces 5, 6, of the frame—likewise with a rack *r* secured to the side of the carriage into which a pinion G works for propelling the carriage toward the saws and when this is thrown out of gear into which a larger pinion L, is made to work turning in a contrary direction for running the carriage back; also furnished with an arm I for throwing the pinion out of gear, likewise with a pin *p*, Fig. 5, on the under side of the piece of the carriage to which the rack is fastened for throwing the large pinion L, out of gear, said pin *p* coming in contact with slide *s* connected with spring M. The pinion G is brought into gear with the rack by depressing the end of the lever H and securing it with a spring K which slips over it. At the same time the other end with the pinion is raised—the pinion coming into gear with the rack; in which position it is held until the arm I, as the carriage advances, striking spring K and disengages it from the lever which causes the pinion to fall out of gear by its superior gravity; h, being the fulcrum on which the lever turns. The other pinion L, for running back the carriage is put into and thrown out of gear in a similar manner—except that the spring M is disengaged from the lever N by means of the pin on the under side of the carriage coming in contact with a slide Fig. 5 attached to spring M.

The gearing by which the saws are turned and the carriage advanced to and receded from them, consists of the main axle t, turned by a pulley s around which a band passes to the driving power which may be steam, water, or horse power. On the main axle t is a large drum T around which, and the pulleys on the axles of the saws pass bands d and e, for turning the same—one of which d, being crossed for reversing the motion of the saw and both are guided by suitable guide rollers or pulleys f, f,—whose position may be changed at pleasure by means of sliding boxes. On the end of the main axle is a small pulley m, around which passes a band O to a larger pulley P, which turns an axle i passing through the side piece 10 of the frame, on the end of which axle is a small pinion Q which works into and turns the cog wheel R fixed on the axle l of the pinion G that advances the carriage—pinion R working into another smaller pinion S, on the axle k on the other end of which is the pinion L for running back the carriage.

Operation: The piece of timber from which the eaves trough is to be made being prepared and secured upon the carriage in a proper position to receive the cuts of the saws for taking out the center of the timber to the same angle at which the saws are placed,—the pinion G is put into gear with the rack by bearing down one end of the lever and raising the other end in which the axle of the pinion turns and hinging the spring K over said depressed end of the lever which secures it in that position until disengaged by the arm I. The machine is then set in motion by any convenient power conveyed from the driving machine to the driving pulley s, by means of a band. This pulley turns the main axle which revolves the drum T, and this gives motion to the saws by means of the bands d, e, leading from said drum to the pulleys on the axle of the saws. At the same time the carriage is advanced with the timber to form the eaves trough by means of the band O, passing around pulleys m, and P, causing the axle i, with the pinion Q to turn which gives a rotary motion to cog-wheel R—its axle l and to, pinion G, on the end thereof which pinion being in gear with the rack of the carriage causes it to advance. When the carriage has traveled as far as it is intended that it should go, the arm I comes in contact with the spring K—pushes it off the end of the lever H and immediately pinion G drops from the rack and of course the carriage stops. The large pinion L (on the axle K on which there is a small pinion S, in gear with cog-wheel R) is now raised and put into gear with the rack of the carriage, which, having a contrary motion to that of pinion G and of much greater diamter—of course runs the carriage quickly back again and on this return motion the pin p, Fig. 5, comes in contact with the slides, s, attached to the spring M—pushes it off the end of the lever and instantly pinion L, drops from the rack and the motion of the carriage is thus arrested. The eaves trough is then removed and the plank or timber advanced toward the saws about 1 inch for another trough and secured on the carriage on a similar manner as before described. Pinion G is again put into gear with the rack and the carriage advanced toward the saws in the same manner as before described for cutting another eave trough. In this manner the operation is continued till the plank is sawed up.

Whenever it is required to cut the eaves trough to an obtuse angle the lower end of the upper saw frame must be raised and secured by the clamp bars a, a, and to cut it to an acute angle the frame must be lowered and secured in the same manner by the clamp-bars a, a. The position of the lower saw need not be changed to effect this object, although it may be changed if required.

D, iron lever in the tail block moved up or down by means of a screw to hold a thick or thin plank or piece of timber for the trough; F, head block or movable rest placed at the front end of the carriage filled with holes and a pin inserted in one of said holes to press the timber up to the saws.

From the foregoing it will be seen that the distinctive character of my invention consists in running two circular saws either at right angles or any other angle at the edge of a carriage propelled by the gearing of the machine which carries forward the timber out of which the troughs are to be sawed, the saws moving in directions opposite to each other with the peripheries or edges almost in contact and the angle of incidence of either saw changed at the pleasure of the operator.

The invention claimed by me, the said

JIRA WING, and which I desire to secure by Letters Patent consists in—
1. The arrangement of the saws in their respective frames.
2. The method of regulating and setting the saw frames.
3. The combination of the two saws.
4. The method of operating the carriage, all as described above.

JIRA WING.

Witnesses:
HARVEY SHIPMAN,
BETSEY SHIPMAN.